Aug. 19, 1930.  W. L. BRADLEY  1,773,567
CHILD'S CART
Filed Aug. 17, 1926   2 Sheets-Sheet 1
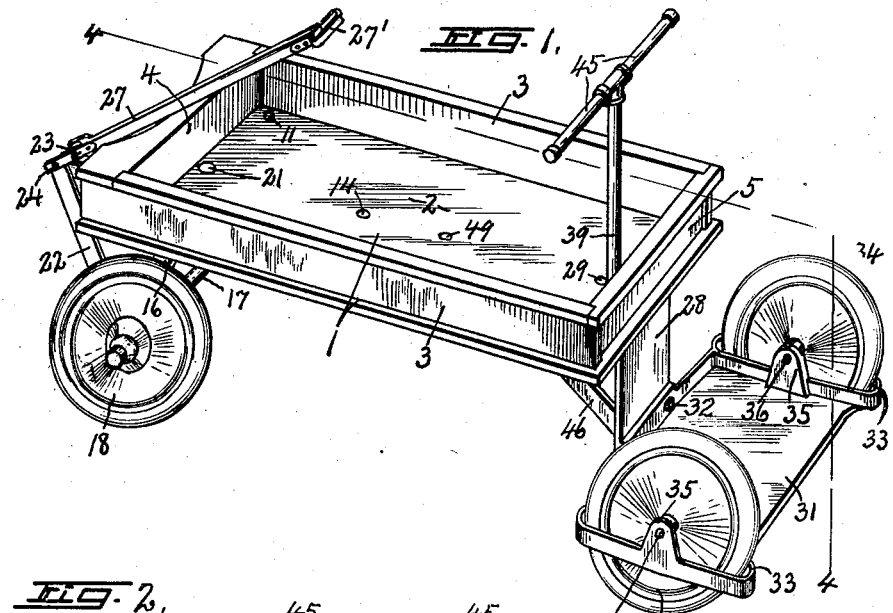
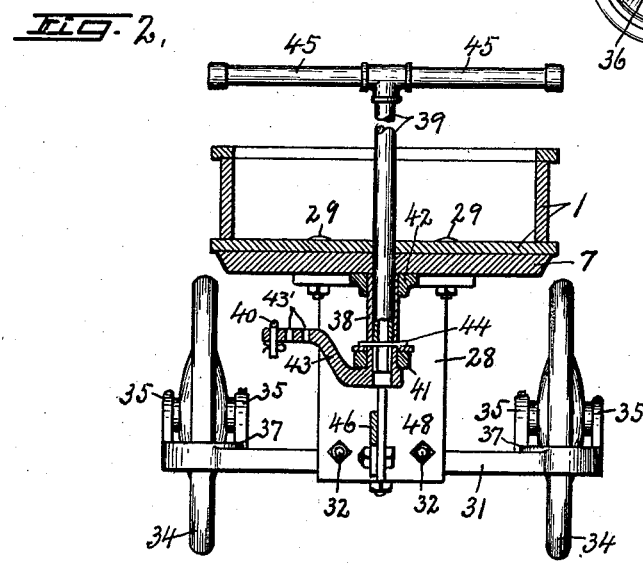
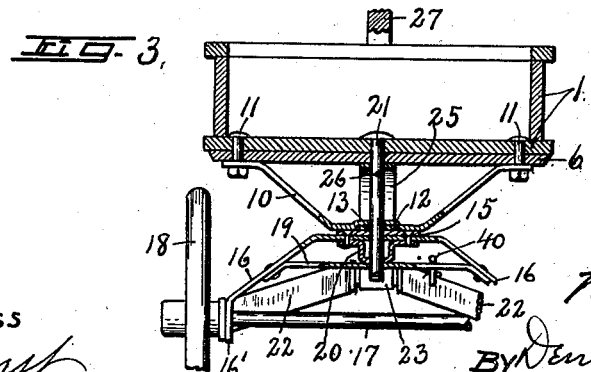
WITNESS
INVENTOR
W. L. Bradley,
By Denison + Thompson
ATTORNEYS

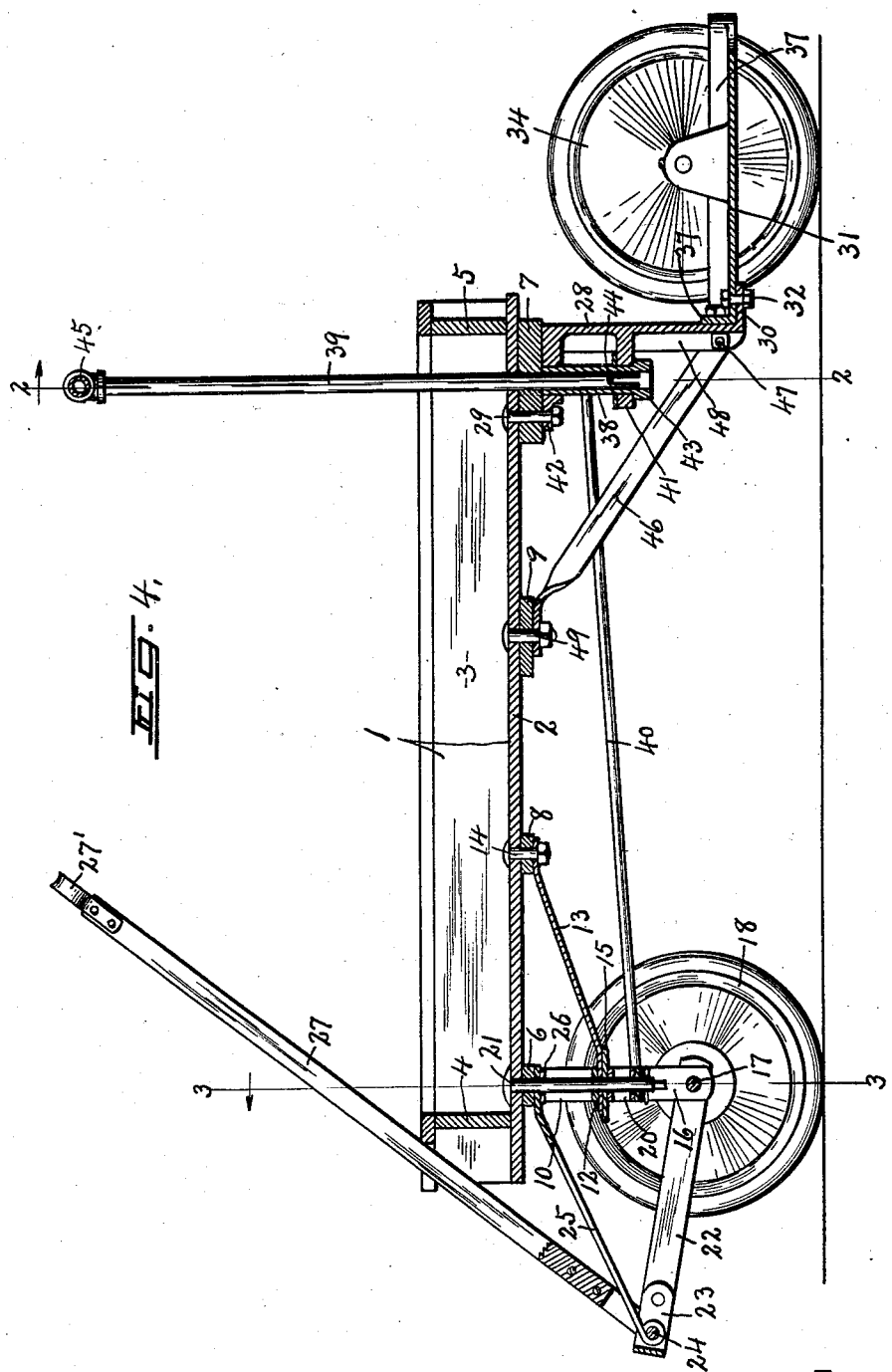

Patented Aug. 19, 1930

1,773,567

UNITED STATES PATENT OFFICE

WALTER L. BRADLEY, OF SYRACUSE, NEW YORK

CHILD'S CART

Application filed August 17, 1926. Serial No. 129,713.

This invention relates to certain improvements in children's carts of the four-wheeled and box-body type in which the axle for the front wheels is turnable about a vertical axis in the longitudinal center of the box for steering purposes while the rear wheels rotate about an axis in fixed relation to the box as distinguished from the two-wheeled platform type commonly known as "kiddie cars."

The carts of both types are commonly used for exercising and pleasurable purposes by bracing one leg or foot upon the body and propelling with the other foot but the four-wheeled type is obviously not as convenient for that use as the two-wheeled type due to the adaptation of the body for receiving and retaining various small objects for transportation from one place to another.

The main object of the present invention is to combine the advantages of both types in a single cart and at the same time to increase its load carrying capacity.

Another object is to enable the cart to be produced at a comparatively low cost by simplifying its construction and reducing the number of parts.

A further object is to arrange the parts of the simplified structure in such manner as to strengthen the entire structure and thereby to prolong its life.

Other objects and uses relating to specific parts of the vehicle will be brought out in the following description.

In the drawings:—

Figure 1 is a perspective view of a cart embodying the various features of my invention.

Figures 2 and 3 are transverse vertical sectional views, partly broken away, taken in the planes of lines 2—2 and 3—3, Figure 4.

Figure 4 is a longitudinal vertical sectional view taken on line 4—4, Figure 1.

As illustrated, this cart comprises a substantially rectangular box or body —1— having a bottom portion —2—, lengthwise side portions —3— and front and rear end portions —4— and —5—.

Suitable cleats or cross bars —6— and —7— are bolted or otherwise secured directly to the underside of the bottom —2— near the front and rear ends thereof respectively for reinforcing purposes and also to receive certain other parts hereinafter described.

Additional cleats or cross bars —8— and —9— are secured to the underside of the intermediate portion of the bottom —2— in spaced relation to each other and to the front and rear cross bars —6— and —7— as shown more clearly in Figure 4 for reinforcing and additionally supporting the central portion of the box.

The parts thus far described are preferably made of wood but obviously may be made of other suitable material if desired.

A U-shaped front bolster bar —10— has its opposite ends secured by bolts —11— to the underside of the front cross bar —6— and to adjacent portions of the bottom —2— equal distances from the longitudinal center of the box while its intermediate portion or apex is substantially flat and disposed in a plane some distance below the bottom of the box except that its central portion is struck up to form a recess —12— in which is seated the front end of a rearwardly extending brace bar —13— having its rear end secured by a bolt —14— to the underside of the central portion of the cross bar —8—, the thickness of the front end of the brace —13— being substantially equal to the depth of the recess —12— so that its lower face will be substantially co-incident with the lower face of the adjacent portion of the bolster bar —10— to form therewith a fifth-wheel bearing adapted to rest upon a substantially flat fifth-wheel section —15—.

This fifth-wheel section —15— is riveted or otherwise secured to the central portion or apex of an underlying inverted U-shaped bolster bar —16— of about the same length as the upper bolster bar —10— and having its opposite ends deflected downwardly at —16'— for receiving and supporting a front axle —17— carrying at its opposite ends a pair of ground wheels —18—.

A brace bar —19— extends across the underside of the central portion of the bolster bar —16— in spaced relation thereto and has its opposite ends riveted or otherwise secured to the opposite downwardly extending arms of said bolster section for stiffening and reinforcing the same.

A relatively short U-shaped filler piece —20— has its opposite ends riveted or otherwise secured to the intermediate portion of the bar —16— and fifth-wheel section —15— at opposite sides of their longitudinal centers and its intermediate portion engaged with the central portion of the cross brace —19— for additionally stiffening the lower bolster section.

The upper bolster bar —10— and its cross bar —6— constitute what may be termed the upper bolster section while the lower bolster bar —16— and its brace bars —19— and —20— together with the fifth-wheel section —15— constitute what may be termed the lower bolster section which is pivotally connected to the upper bolster section and to the bottom of the box —1— by means of a king bolt —21—.

That is, the king bolt —21— is passed through registering openings in both bolster sections to permit relative turning movement of the front axle —17— and its wheels —18— for steering purposes.

A pair of tongue arms —22— are mounted at their rear ends upon the opposite ends of the axle —17— just at the outside of the adjacent ends of the bolster bar —16— to converge forwardly therefrom some distance beyond the front wheels —18— and united at their front ends by a connecting yoke —23— and a transverse bolt —24—, said tongue serving as a means for turning the axle —17— and corresponding bolster section about the axis of the king bolt —21—.

A brace —25— connects the intermediate portion of the bolt —24— with the king bolt —21— just below and against the underside of the front cross bar —6—, the rear end of said brace being held against downward displacement by a cotter key or pin —26— passing through an aperture in the king bolt.

This brace —25— serves to hold the tongue —22— against vertical movement and preferably in a forwardly and upwardly inclined plane.

A pole —27— is pivotally connected at one end to the outer ends of the pivotal bolt —24— to swing vertically and forwardly and rearwardly to different angles as may be most convenient for propelling and steering the vehicle, the opposite end of the pole being provided with a handle —27'— by which it may be manipulated.

The tongue —22— extends forwardly some distance beyond the front end of the box —1— while the pole —27— is of sufficient length to extend some distance above the body and against the front end thereof when rocked upwardly and rearwardly thus permitting the handle —27'— to overlie the intermediate portion of the box for convenience of operation for steering by the occupant of the box if desired.

The axle —17— is preferably journaled in the opposite ends of the lower bolster bar —15— for rotary movement while the wheels —18— may also be journaled upon the outer ends of the axle for relative rotary movement thereon and may be held against axial displacement by any suitable means commonly employed for that purpose.

A rear upright bolster section —28— is secured at its upper end by bolts —29— to the underside of the rear cross bar —7— to extend downwardly therefrom directly below the rear end of the box —1— and preferable consists of a cast metal bracket having its lower end provided with a rearwardly projecting horizontal flange —30— in a plane some distance below the axis of the front wheels —18— and axle —17— but a sufficient distance above the ground-engaging portion of the front wheels to clear ordinary obstacles in the road or pavement.

A horizontal step —31— of suitable metal is rigidly secured at its front edge by bolts —32— to the flange —30— and to the adjacent upright portion of the bracket —28— to extend rearwardly therefrom some distance beyond the rear end of the box —1— and is provided near its opposite sides with parallel lengthwise slots or openings —33—for receiving a pair of rear wheels —34—.

The intermediate portions of opposite walls of the slots —33— are provided with upstanding lugs —35— for receiving and supporting a pair of co-axial journal bearings or pins —36— upon which the adjacent wheels —34— are journaled so as to revolve in their respective slots or openings —33— about an axis substantially midway between the front and rear edges of the step to reduce the liability of tilting the front end of the box upwardly when the step is supporting the weight of the user.

The wheels —34— serve to support the step —31— and through the bracket —28— to support the rear end of the body or box —1—.

The walls of the openings —33— are raised above the intermediate portion of said step to form guard flanges —37— to prevent contact of the foot or feet of the user with the wheels and also to prevent slipping of the foot forwardly from the step, the remaining portions of the step being substantially flat and horizontal and extending some distance forwardly and rearwardly beyond the axis of the wheels —34— to afford ample space for supporting the foot or feet of the user.

Suitable means, operable from the rear end of the cart, is provided for turning the lower front bolster section about the axis of the king bolt —21—, said means consisting of upright steering post sections —38—, and —39— and a rearwardly extending link —40— having its front end eccentrically connected to the post section —38— and its rear end connected to the brace bar —19— of the lower front bolster section at one side of the king bolt —21—.

The post section —38— is preferably tubular and is journaled in vertically alined openings in rearwardly projecting flanges —41— and —42— on the bracket —28— below the bottom —2— of the box —1— and is provided at its lower end with a laterally and upwardly projecting crank arm —43— to which the adjacent end of the link —40— is pivotally connected as shown more clearly in Figure 2.

This crank arm —43— is provided with a plurality of apertures —43'— at different distances from its center to vary the amount of movement of the steering wheels.

The rear end of the link —40— may be inserted in any one of the openings —43'— while the front end is inserted in an aperture in the brace —19— of the lower front bolster section whereby the turning of the tubular post —38— will transmit similar turning movement to the axle —17— and wheels —18— for dirigible purposes.

The post is held against downward displacement by a cross pin —44— which passes diametricallly through an aperture in the post just above the lower flange —41— as shown in Figures 2 and 4.

The post section —39— is slidable telescopically in the section —38— and has its lower end slotted lengthwise for receiving the pin —44— and for interlocking engagement therewith to transmit rotary motion from the section —39— to the section —38—.

The post —39— extends some distance above the top of the box —1— and is provided at its upper end with oppositely extending handle bars —45— within easy reaching distance of the operator standing on the step —31— whereby the rotation of the section —39— in reverse directions will be transmitted first to the tubular post —38— through the medium of the pin —44— and thence through the crank arm —43— and link —40— to the lower front bolster section carrying the axle —17— as may be required to direct the movement of the vehicle.

It will be observed that the operator standing on the step —31— has free access for movement of the feet and legs the entire width of the body or between the wheels —34—, this movement being permitted by extending the step rearwardly beyond the rear end of the body and by supporting it wholly at the front of the step.

It will also be noted that the mounting of the wheels directly upon opposite sides of the step and considerably below the mass of weight of the vehicle reduces to a minimum the liability of overturning of the cart, particularly when turning sharp corners.

Whenever desired, the handle post —39— may be withdrawn upwardly from the tubular section —38— and laid in the bottom of the box thereby permitting the entire capacity of the box to be used for transporting articles from place to place.

A brace bar —46— is secured at one end of a bolt —47— to a rearwardly projecting central flange —48— on the bracket —28— to extend upwardly and forwardly therefrom and has its front end secured by a bolt —49— to the underside of the intermediate cross bar —9—, Figure 4, said brace —46— being arranged along the longitudinal center of the box —1— and bracket —28— for stiffening the bracket against forward and rearward movement relatively to the body.

*Operation*

When the car is used in the place of a kiddie car, the pole —27— may be tilted upwardly and rearwardly to rest upon the front of the box and to extend rearwardly therefrom in which case the handle post —39— will be inserted into the tubular section —38— for interlocking connection therewith.

The operator then places one foot upon the step —31— and his hands upon the handle bars —45— and with the other foot on the ground propels the machine forwardly in the manner of stepping while with the hands on the handle bars —45— the direction of the motion of the machine may be easily guided.

Also in coasting the operator may stand with both feet upon the step —31— and direct the movement of the car by means of the handle bars —45— which also serve to steady the rider upon the step.

During either of these operations, the various articles, or one or more other passengers, may be carried in the box —1— for transportation. In case another passenger is carried the steering post —39— may be moved or left in place at the will of the operator and the course of the machine directed by the passenger through the medium of the pole —27— or the rider on the step —31—may assist in guiding the vehicle by means of the handle bars —45—.

When the vehicle is used solely for transporting loads from place to place the post —39— may be removed and placed in the bottom of the box together with any other objects constituting the load under which conditions the machine may be propelled forwardly and rearwardly and guided by means of the pole —27— which would then be swung forwardly and downwardly to a convenient position for handling.

A cart constructed in the manner described is adapted for a wide variety of uses and is particularly light, strong and durable but it is evident that various parts thereof may be somewhat modified without departing from the the spirit of this invention.

What I claim is:—

1. In a child's cart having a body, a pair of front supporting wheels and a pair of rear supporting wheels, a bolster secured to and extending downwardly from the rear end of the body, a step secured to and projecting rearwardly from the bolster in a horizontal plane below the axis of the rear wheels and having its opposite sides provided with wheel-receiving slots, and said rear wheels journaled in a plane intermediate the front and rear edges of the step in opposite lengthwise walls of respective slots to revolve therein.

2. In a vehicle of the character described, a body section, means including a pair of steering wheels for supporting the front end of the body section and a pair of wheels for supporting the rear end of said body, a bolster secured to and projecting downwardly from the rear end of the body section, a step secured to and projecting rearwardly from the lower edge of the bolster in a horizontal plane below the axis of the rear wheels and provided with laterally spaced vertical openings therethrough of greater length than the diameter of the rear wheel, said step having upwardly projecting lugs positioned intermediate the front and rear edges and at opposite sides of each opening, and said rear wheels journaled on said lugs to rotate in said openings.

In witness whereof I have hereunto set my hand this 30 day of July 1926.

WALTER L. BRADLEY.